United States Patent
Tsai et al.

(10) Patent No.: US 7,733,975 B1
(45) Date of Patent: Jun. 8, 2010

(54) METHOD FOR ESTIMATING PHASE ERROR IN MIMO OFDM COMMUNICATIONS SYSTEM

(75) Inventors: Shang-Ho Tsai, Kaohsiung (TW);
Hsiao-Lan Chiang, Miaoli County (TW); Hsuan-Yu Liu, Hsinchu County (TW); Po-Yuen Cheng, San Jose, CA (US)

(73) Assignee: Mediatek Inc., Hsin-Chu (TW)

( * ) Notice: Subject to any disclaimer, the term of this patent is extended or adjusted under 35 U.S.C. 154(b) by 0 days.

(21) Appl. No.: 12/346,886

(22) Filed: Dec. 31, 2008

(51) Int. Cl.
*H04B 7/08* (2006.01)
*H04L 27/28* (2006.01)

(52) U.S. Cl. ...................... 375/267; 375/260
(58) Field of Classification Search ........... 375/260, 375/267, 347, 354; 370/208, 210, 503
See application file for complete search history.

(56) References Cited

U.S. PATENT DOCUMENTS 7,289,570 B2 * 10/2007 Schmidl et al. ............. 375/267
2005/0078599 A1 * 4/2005 Zhidkov et al. ............. 370/210
2005/0281358 A1 * 12/2005 Bottomley et al. .......... 375/343
2006/0034398 A1 * 2/2006 Reznik et al. .............. 375/340
2008/0298227 A1 * 12/2008 Jonsson .................... 370/210

\* cited by examiner

*Primary Examiner*—Young T. Tse
(74) *Attorney, Agent, or Firm*—Winston Hsu

(57) ABSTRACT

A method for estimating a phase error existing in a receiver of a MIMO OFDM communications system is disclosed. The method includes executing Hermitian transpose on channel coefficient matrix of the MIMO OFDM communications system for generating Hermitian-transposed channel coefficient matrix, multiplying received signal matrix of the receiver with the Hermitian-transposed channel coefficient matrix for generating converted signals, summing products of the converted signals and complex conjugates of pilot signals corresponding to the converted signals for generating a sum result, and generating the phase error according to the sum result, the converted signals, and the complex conjugates of the pilot signals. The pilot signals are extracted from the received signal matrix.

18 Claims, 4 Drawing Sheets

METHOD FOR ESTIMATING PHASE ERROR IN MIMO OFDM COMMUNICATIONS SYSTEM

BACKGROUND OF THE INVENTION

1. Field of the Invention

The present invention relates to a method for estimating phase error in MIMO OFDM communications system, and more particularly, to a method for estimating phase error existing in the receiver of the MIMO OFDM communications system.

2. Description of the Prior Art

Please refer to FIG. 1. FIG. 1 is a diagram illustrating a conventional Multiple Input Multiple Output (MIMO) Orthogonal Frequency Division Multiplexing (OFDM) communications system 100. It is noted that the MIMO OFDM communication system here includes Multiple Input Single Output (MISO) OFDM communication system, for example, a 2T1 R OFDM system, i.e. the number of the transmitting antennas $T_X$ is 2, and the number of the receiving antennas $R_X$ is 1.

The MIMO OFDM communications system 100 comprises a transmitter 110 for transmitting radio frequency signals and a receiver 120 for receiving radio frequency signals from the transmitter 110.

The transmitter 110 comprises a modulation device 111, a space-time-frequency processing device 112, a transmitting signal transforming module 116, and a plurality of transmitting antennas $T_X$.

The transmitting signal transforming module 116 comprises an Inverse Fast Fourier Transform (IFFT) device 113, a Digital/Analog Converter (DAC) 114, and an RF (radio frequency) circuit 115.

The modulation device 111 is disposed for modulating data. The space-time-frequency processing device 112 is coupled to the modulation device 111 and disposed for processing the modulated data. The transmitting signal transforming module 116 is coupled between the space-time-frequency processing device 112 and the transmitting antennas $T_X$ for receiving the processed data from the space-time-frequency processing device 112 and transforming the received data to radio frequency signals to the transmitting antennas $T_X$. More particularly, in the transmitting signal transforming module 116, the IFFT device 113 is coupled to the space-time-frequency processing device 112 and disposed for executing IFFT on the processed modulated data and accordingly outputting transformed data; the DAC 114 is coupled to the IFFT device 113 and disposed for converting the transformed data to analog signals; the RF circuit 115, coupled to the DAC 114, receives the analog signals and accordingly up-converts the received analog signals to radio frequency signals. The antennas $T_X$, coupled to the RF circuit 115 of the transmitting signal transforming module 116, receives the radio frequency signals from the RF circuit 115 and transmits the received radio frequency signals.

The receiver 120 comprises a plurality of receiving antennas $R_X$, a receiving signal transforming module 130, a timing/phase compensation device 123, an equalizer 124, a demodulation device 125, and a Phase Lock Loop (PLL) 126.

The receiving signal transforming module 130 comprises an RF circuit 127, an Analog/Digital Converter (ADC) 121, and an FFT device 122.

The receiving antennas $R_X$ receive the radio frequency signals transmitted from the transmitting antennas $T_X$ of the transmitter 110. The receiving signal transforming module 130 is coupled between the receiving antennas $R_X$ for receiving the radio frequency signals and transforming the received radio frequency signals to transformed signals to the time/phase compensation device 123. More particularly, in the receiving signal transforming module 130, the RF circuit 127, coupled to the receiving antennas $R_X$, down-converts the radio frequency signals received from the receiving antennas $R_X$, i.e., a plurality of receiving paths, to base band or intermediate band analog signals; the ADC 121, coupled to the RF circuit 127, converts the analog signals from the RF circuit 127 to digital signals; the FFT device 122, coupled to the ADC 121, executes FFT on the digital signals received from the ADC 121 and accordingly outputs transformed signals. The timing/phase compensation device 123, coupled to the FFT device 122 of the receiving signal transforming module 130, compensates the transformed signals according to the phase outputted from the PLL 126. The equalizer 124, coupled to the timing/phase compensation device 123, the demodulation device 125, and the PLL 126, equalizes the compensated signals from the timing/phase compensation device 123 and accordingly outputs to the demodulation device 125, and estimates phase error θ of the received compensated signals and outputs the estimated phase error θ to the PLL 126. The PLL 126, coupled to the equalizer 124, receives the phase error θ and accordingly adjusts its phase, and outputs a clock signal with the adjusted phase to the timing/phase compensation device 123. The demodulation device 125, coupled to the equalizer 124, demodulates the equalized signals and accordingly outputs data.

Because of frequency mismatch, timing drift or Common Phase Error (CPE), a phase error θ exists between the actual received signal and the correct signal. Therefore, in data tones, the equalizer 124 is utilized to estimate the phase error θ of the received signal and accordingly outputs the estimated phase error θ to the PLL 126 since the data signal can be extracted from the received radio frequency signal. Consequently, the PLL 126 enables the timing/phase compensation device 123 to correctly compensate the timing/phase of the received signals. The equalizer 124 can be a zero-forcing (ZF) equalizer.

Assuming the number of the transmitting antennas $T_X$ is 2, and the number of the receiving antennas $R_X$ is 3 (a 2T3R OFDM communications system), therefore, the received signals (after being fast Fourier transformed) can be derived from the following equations:

$$[y_{1,t} \ y_{1,t+1}] = [h_{11} \ h_{12}] \begin{bmatrix} x_1 e^{j\theta} & x_2 e^{j\theta} \\ -x_2^* e^{j\theta} & x_1^* e^{j\theta} \end{bmatrix} + [n_{1,t} \ n_{1,t+1}]; \quad (1)$$

$$[y_{2,t} \ y_{2,t+1}] = [h_{21} \ h_{22}] \begin{bmatrix} x_1 e^{j\theta} & x_2 e^{j\theta} \\ -x_2^* e^{j\theta} & x_1^* e^{j\theta} \end{bmatrix} + [n_{2,t} \ n_{2,t+1}]; \quad (2)$$

$$[y_{3,t} \ y_{3,t+1}] = [h_{31} \ h_{32}] \begin{bmatrix} x_1 e^{j\theta} & x_2 e^{j\theta} \\ -x_2^* e^{j\theta} & x_1^* e^{j\theta} \end{bmatrix} + [n_{3,t} \ n_{3,t+1}]; \quad (3)$$

-continued $$Y_{6\times1} = \begin{bmatrix} y_{1,t} \\ y_{1,t+1}^* \\ y_{2,t} \\ y_{2,t+1}^* \\ y_{3,t} \\ y_{3,t+1}^* \end{bmatrix}_{6\times1} = \quad (4)$$

$$H_{6\times2} \cdot X_{2\times1} + N_{6\times1} = \begin{bmatrix} h_{11} & -h_{12} \\ h_{12}^* & +h_{11}^* \\ h_{21} & -h_{22} \\ h_{22}^* & +h_{21}^* \\ h_{31} & -h_{32} \\ h_{32}^* & +h_{31}^* \end{bmatrix}_{6\times2} \begin{bmatrix} x_1 e^{j\theta} \\ x_2^* e^{j\theta} \end{bmatrix}_{2\times1} + \begin{bmatrix} n_{1,t} \\ n_{1,t+1}^* \\ n_{2,t} \\ n_{2,t+1}^* \\ n_{3,t} \\ n_{3,t+1}^* \end{bmatrix}_{6\times1};$$

$$G_{2\times6} = pinv(H) = (H_{6\times2}^H \cdot H_{6\times2})^{-1} \cdot H_{6\times2}^H \quad (5)$$

$$= \frac{1}{\sum_{i=1:3}\sum_{j=1:2} h_{ij}^2} \cdot \begin{bmatrix} +h_{11}^* & +h_{12} & +h_{21}^* & +h_{22} & +h_{31}^* & +h_{32} \\ -h_{12}^* & +h_{11} & -h_{22}^* & +h_{21} & -h_{32}^* & +h_{31} \end{bmatrix};$$

$$X_{2\times1} = \begin{bmatrix} x_1 e^{j\theta} \\ x_2^* e^{j\theta} \end{bmatrix} = G_{2\times6} \cdot Y_{6\times1} + N_{2\times1}; \quad (6)$$

where * represents the complex conjugate of the corresponding symbol (each symbol in the equations (1)~(6) are complex numbers), $X_{2\times1}$ represents the data signal matrix, $Y_{6\times1}$ represents the received signal matrix after being fast Fourier transformed, H represents the channel coefficient matrix, $G_{2\times6}$ represents the gain matrix, $N_{2\times1}$ represents the noise matrix, $H^H$ represents the Hermitian transpose of the channel coefficient matrix H, each element $h_{ij}$ in the matrix H represents the channel coefficient between one transmitting antenna and one receiving antenna, $n_j$ and $n_{j,t+1}$ represent noise, $y_{i,t}$ and $y_{i,t+1}$ represents the received signals from the $l^{th}$ receiving antennas $R_X$ after being fast Fourier transformed, and $x_j$ represents the data signal. Therefore, in data tone, the equalizer 124 can estimate the phase error θ according to the equations (1)~(6). The PLL 126 adjusts its phase according to the estimated phase error θ and enables the timing/phase compensation device 123 to correctly compensate the timing/phase of the received signals.

However, in the equation (6), the value of the gain of the gain matrix G is not relatively large enough (compared to the noise), and thus the noise matrix N cannot be ignored, which affects the accuracy of the estimation of the phase error θ.

Furthermore, in the MIMO OFDM communications system, the number of the receiving antennas has to be larger than the number of the transmitting antennas. In other words, the number of the receiving antennas cannot be less than the number of the transmitting antennas. Assuming the number of the transmitting antennas $T_X$ is 2, and the number of the receiving antennas $R_X$ is 1 (a 2T1R OFDM communications system), therefore, the received signals can be derived from the following equations:

$$y_1 = [h_{11} \ h_{12}] \begin{bmatrix} x_1 e^{j\theta} \\ x_2 e^{j\theta} \end{bmatrix} = (h_{11}x_1 + h_{12}x_2)e^{j\theta} + \text{noise}; \quad (7)$$

where $y_1$ represents the received signal after being fast Fourier transformed, $x_1$ and $x_2$ represent the pilot signals, $h_{11}$ and $h_{12}$ represent the channel coefficients. If $x_1=1$, $x_2=-1$, and $h_{11}$ and $h_{12}$ are almost the same, in this condition, the received signal $y_1$ approximately equals the noise, and consequently the phase error θ cannot be estimated, which is why in the MIMO OFDM communications system, the number of the receiving antennas has to be larger than the number of the transmitting antennas.

SUMMARY OF THE INVENTION

The present invention provides a receiver of a Multiple Input Multiple Output (MIMO) Orthogonal Frequency Division Multiplexing (OFDM) communications system. The receiver comprises at least one receiving antenna for receiving radio frequency signals from at least one receiving paths, wherein a pilot signal is extracted from each of the received radio frequency signals, a receiving signal transforming module coupled to the at least one receiving antenna for receiving the radio frequency signals and generating transformed signals accordingly, a signal converting device coupled to the receiving signal transforming module for converting the received transformed signals to converted signals, and a signal summation device coupled to the signal converting device for summing products of the converted signals and complex conjugates of pilot signals corresponding to the converted signals and accordingly generating a sum result, and a Phase Lock Loop (PLL) coupled to the signal summation device, estimating a phase error according to the sum result, the converted signals, and the complex conjugates of the pilot signals.

The present invention further provides a method for estimating a phase error existing in a receiver of a MIMO OFDM communications system. The method comprises executing Hermitian transpose on channel coefficient matrix of the MIMO OFDM communications system for generating Hermitian-transposed channel coefficient matrix, multiplying received signal matrix of the receiver with the Hermitian-transposed channel coefficient matrix for generating converted signals, summing products of the converted signals and complex conjugates of pilot signals corresponding to the converted signals for generating a sum result, wherein the pilot signals are extracted from the received signal matrix, and generating the phase error according to the sum result, the converted signals, and the complex conjugates of the pilot signals.

The present invention further provides a method for estimating a phase error existing in a receiver of a MIMO OFDM communications system. The method comprises executing Hermitian transpose on channel coefficient matrix of the MIMO OFDM communications system for generating Hermitian-transposed channel coefficient matrix, multiplying the Hermitian-transposed channel coefficient matrix with the channel coefficient matrix for generating product channel coefficient matrix, inversing the product channel coefficient matrix for generating an inversed product channel coefficient matrix, adding a real constant to each element on diagonal of the inversed product channel coefficient matrix for generating a constant-added inversed product channel coefficient matrix, multiplying the constant-added inversed product channel coefficient matrix with Hermitian-transposed channel coefficient matrix for generating a diversity gain matrix, and generating the phase error according to the diversity gain matrix, a received signal matrix, and a pilot signal matrix.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
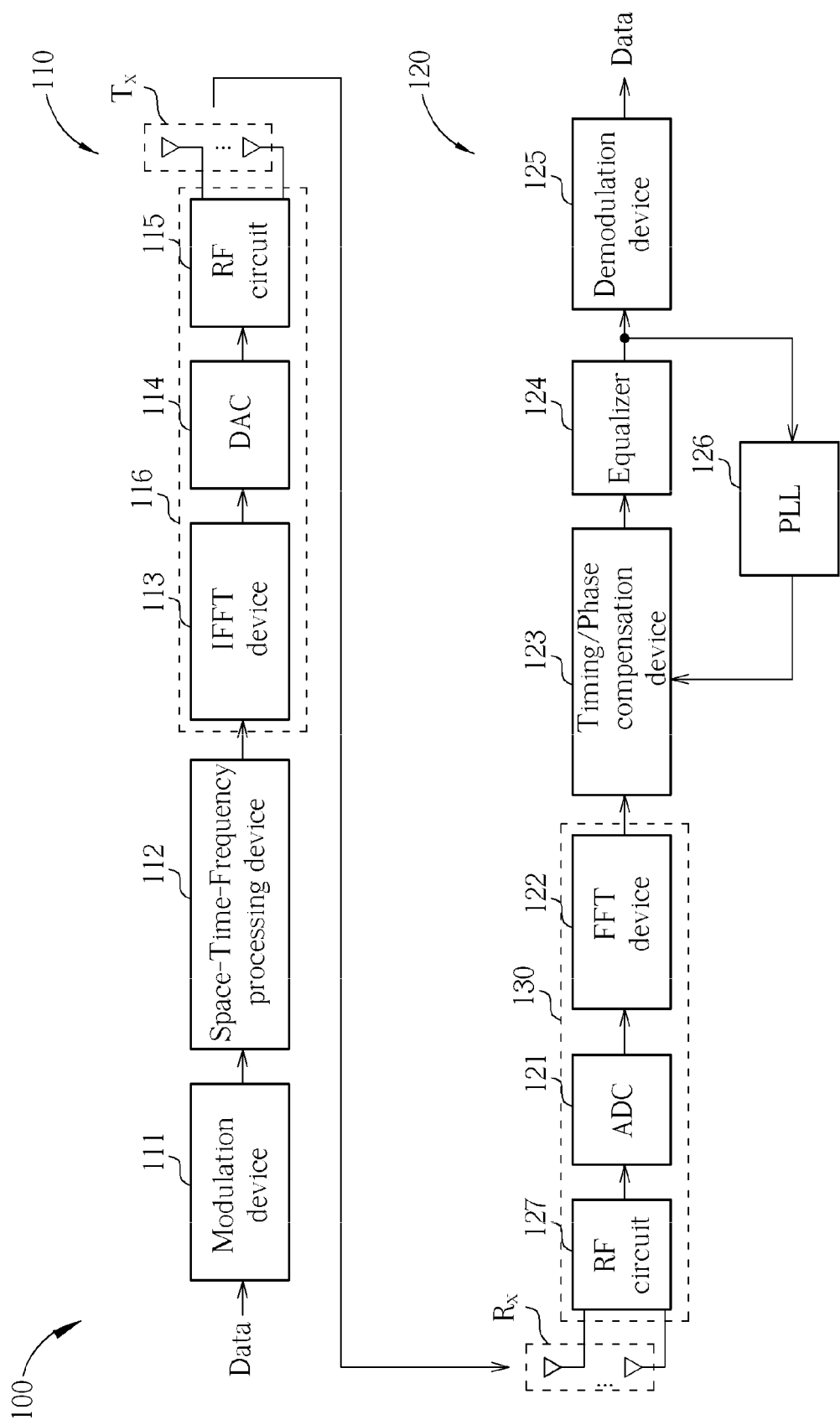
FIG. 1 is a diagram illustrating a conventional MIMO OFDM communications system.
Figure 2:
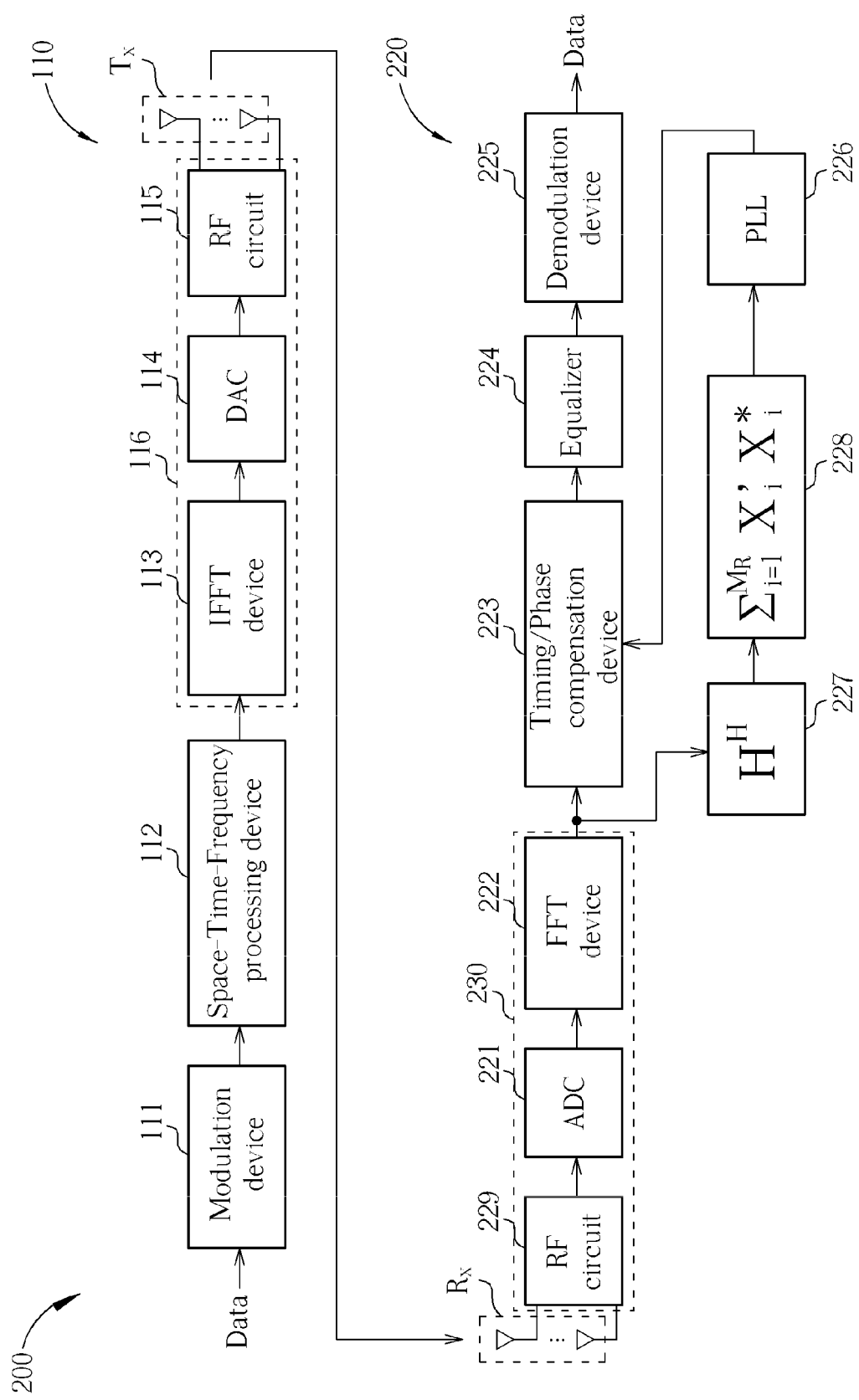
FIG. 2 is a diagram illustrating an MIMO OFDM communications system according to a first embodiment of the present invention.

Please refer to FIG. 2. FIG. 2 is a diagram illustrating an MIMO OFDM communications system 200 according to a first embodiment of the present invention.

The MIMO OFDM communications system 200 comprises a transmitter 110 for transmitting radio frequency signals and a receiver 220 for receiving radio frequency signals from the transmitter 110.

The transmitter 110 functions as the same in the conventional MIMO OFDM communications system 100 and the related description is omitted.

The receiver 220 comprises a plurality of receiving antennas $R_X$, a receiving signal transforming module 230, a timing/phase compensation device 223, an equalizer 224, a demodulation device 225, a PLL 226, a signal converting device 227, and a signal summation device 228.

The receiving signal transforming module 230 comprises an RF circuit 229, an ADC 221, and an FFT device 222.

The receiving antennas $R_X$ receive the radio frequency signals transmitted from the transmitting antennas $T_X$ of the transmitter 110. The receiving signal transforming module 230 is coupled between the receiving antennas $R_X$ and the time/phase compensation device 223 for receiving the radio frequency signals and transforming the received signals to transformed signals to the time/phase compensation device 223. More particularly, in the receiving signal transforming module 230, the RF circuit 229 receives the radio frequency signals from the receiving antennas $R_X$ and down-converts the received radio frequency signals to base band or intermediate band analog signals; the ADC 221, coupled to the RF circuit 229, converts the analog signals received from the RF circuit 229 to digital signals; the FFT device 222, coupled to the ADC 221, executes FFT on the received digital signals from the ADC 221 and accordingly outputs transformed signals. The timing/phase compensation device 223, coupled to the FFT device 222 of the receiving signal transforming module 230, compensates the transformed signals according to the phase outputted from the PLL 226. The PLL 226, coupled to the signal summation device 228, estimates the phase error θ, and accordingly adjusts its phase to output a clock signal with the adjusted phase to the timing/phase compensation device 223. The equalizer 224, coupled between the timing/phase compensation device 223 and the demodulation device 225, equalizes the compensated signals from the timing/phase compensation device 223. The demodulation device 225, coupled to the equalizer 224, demodulates the equalized signals and accordingly outputs data.

In pilot tone, the signal converting device 227, the signal summation device 228, and the PLL 226 are utilized to estimate the phase error θ of the received signal y (after being fast Fourier transformed). Therefore, the clock signal with the adjusted phase outputted from the PLL 226 enables the timing/phase compensation device 223 to correctly compensate the timing/phase of the received signal y.

The signal converting device 227 is coupled between the FFT device 222 and the signal summation device 228. The signal summation device 228 is coupled between the signal converting device 227 and the PLL 226.

The signal converting device 227 executes Hermitian transpose on the channel coefficient matrix H and multiplies the transposed matrix $H^H$ with the received signal y. Therefore, the signal converting device 227 generates converted signal x' according to the received signal y, and the channel coefficient matrix H.

The signal summation device 228 sums all of the products of each converted signal x' and the complex conjugate of its corresponding pilot signal x.

The PLL 226 estimates the phase error θ according to the sum result of the signal summation device 228, the converted signal x', and the complex conjugates of the pilot signal x.

Assuming the number of the transmitting antennas $T_X$ is 2, and the number of the receiving antennas $R_X$ is 2 (a 2T2R OFDM communications system), therefore, the received signal y (after being fast Fourier transformed) can be derived from the following equations:

$$Y_{2\times1} = \begin{pmatrix} y_1 \\ y_2 \end{pmatrix} = H_{2\times2} \cdot X_{2\times1} + N_{2\times1} = \begin{pmatrix} h_{11} & h_{12} \\ h_{21} & h_{22} \end{pmatrix} \begin{pmatrix} x_1 e^{j\theta} \\ x_2 e^{j\theta} \end{pmatrix} + \begin{pmatrix} n_1 \\ n_2 \end{pmatrix}; \quad (8)$$

where $Y_{2\times1}$ represents the received signal matrix after being fast Fourier transformed, $H_{2\times2}$ represents the channel coefficient matrix, $X_{2\times1}$ represents the pilot signal matrix, and $N_{2\times1}$ represents the noise matrix; the signal converting device 227 executes Hermitian transpose on the channel coefficient matrix H, and multiplies the received signal Y, which derives the following equation (ignoring the noise matrix $N_{2\times1}$):

$$\begin{pmatrix} x'_1 \\ x'_2 \end{pmatrix} = H^H_{2\times2} \cdot Y_{2\times1} = \begin{pmatrix} h^*_{11} & h^*_{21} \\ h^*_{12} & h^*_{22} \end{pmatrix} \begin{pmatrix} h_{11} & h_{12} \\ h_{21} & h_{22} \end{pmatrix} \begin{pmatrix} x_1 e^{j\theta} \\ x_2 e^{j\theta} \end{pmatrix} \quad (9)$$

$$= \begin{pmatrix} (|h_{11}|^2 + |h_{21}|^2) x_1 e^{j\theta} + (h^*_{11} h_{12} + h^*_{21} h_{22}) x_2 e^{j\theta} \\ (|h_{12}|^2 + |h_{22}|^2) x_2 e^{j\theta} + (h^*_{12} h_{11} + h^*_{22} h_{21}) x_1 e^{j\theta} \end{pmatrix};$$

the signal summation device 228 sums the products of $x_1' x_1^*$ and $x_2' x_2^*$ and accordingly generates the following equation:

$$x'_1 x^*_1 + x'_2 x^*_2 \quad (10)$$
$$= (|h_{11}|^2 + |h_{21}|^2)|x_1|^2 e^{j\theta} + (|h_{12}|^2 + |h_{22}|^2)|x_2|^2 e^{j\theta} +$$
$$(h^*_{11} h_{12} + h^*_{21} h_{22}) x_2 x^*_1 e^{j\theta} + (h^*_{12} h_{11} + h^*_{22} h_{21}) x_1 x^*_2 e^{j\theta}$$
$$= \{(|h_{11}|^2 + |h_{21}|^2)|x_1|^2 + (|h_{12}|^2 + |h_{22}|^2)|x_2|^2 +$$
$$2 \operatorname{Re}[(h^*_{11} h_{12} + h^*_{21} h_{22}) x_2 x^*_1]\} e^{j\theta}$$
$$= C e^{j\theta};$$

where $\text{Re}[(h_{11}*h_{12}+h_{21}*h_{22})x_2x_1]$ represents the real part of $[(h_{11}*h_{12}+h_{21}*h_{22})x_2x_1]$, and C represents $\{(|h_{11}|^2+|h_{21}|^2)|x_1|^2+(|_{12}|^2+|h_{22}|^2)|x_2|^2+2\text{Re}[(h_{11}*h_{12}+h_{21}*h_{22})x_2x_1*]\}$, which is a real value.

In the equation (9), because the received signals $y_1$ and $y_2$ are known, and the channel coefficients $h_{11}$, $h_{12}$, $h_{21}$, and $h_{22}$ are known, the converted signals $x_1'$ and $x_2'$ can be derived.

Since the result generated from the signal summation device 228 is large enough to ignore the noise matrix $N_{2\times 1}$, the phase error $\theta$ can be easily derived from the equation (10). In other words, in the equation (10), the term $(Ce^{j\theta}+\text{noise})$ should be instead of the term $Ce^{j\theta}$. However, the constant C is so much larger than the noise term that the noise term can be ignored. Therefore, the phase error $\theta$ can be estimated from the tangent of "$x_1'x_1*+x_2'x_2*$". For example, if "$x_1'x_1*+x_2'x_2*$" equals to $(1+j1)$, the tangent of "$x_1'x_1*+x_2'x_2*$" is 1, and thus, the phase error $\theta$ equals to 45°. Therefore, the PLL 226 can efficiently estimate the phase error $\theta$. The PLL 226 then adjusts its phase according to the estimated phase error $\theta$ (for example, 45°) and enables the timing/phase compensation device 223 to correctly compensate the timing/phase of the received signal.

Figure 3:
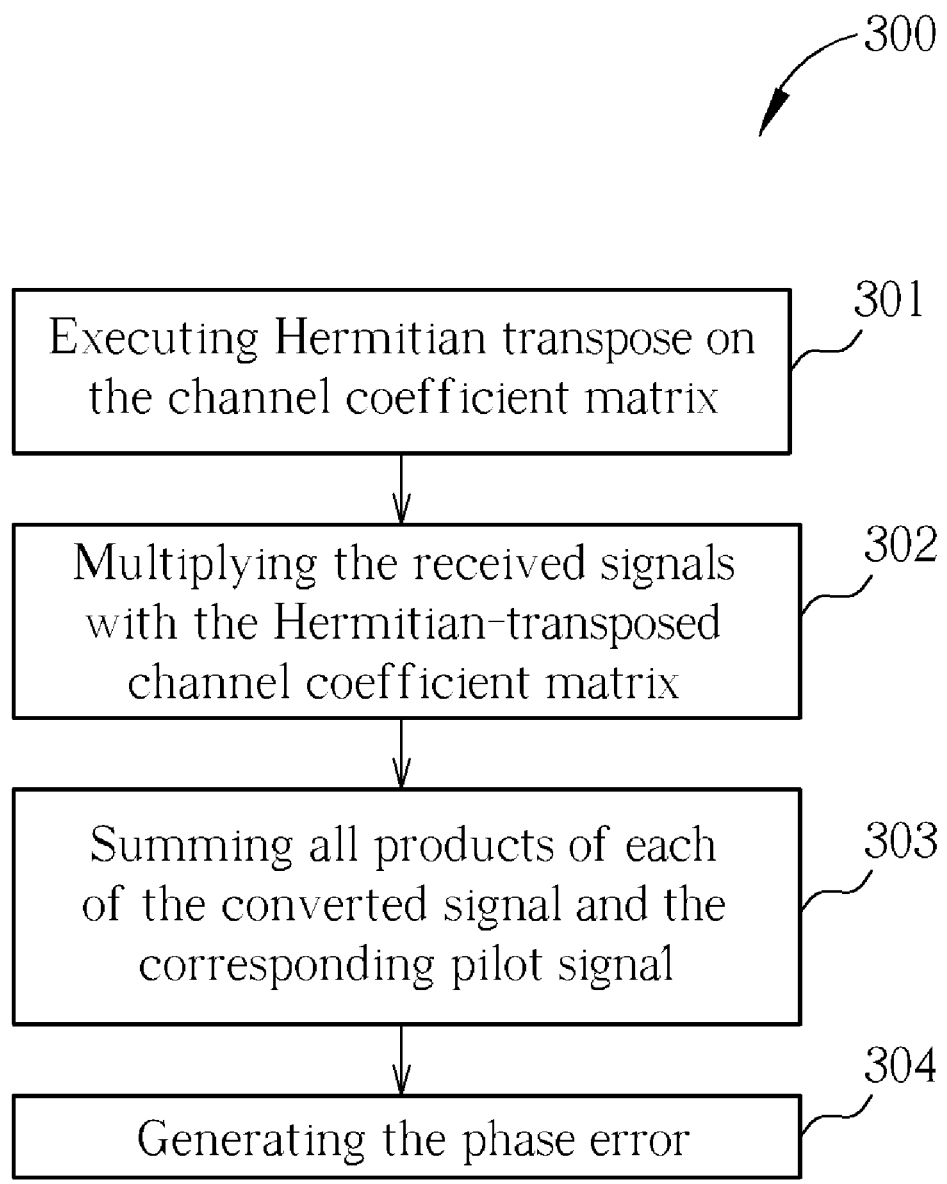
FIG. 3 is a flowchart illustrating a method for estimating phase error according to the first embodiment of the present invention.

Please refer to FIG. 3. FIG. 3 is a flowchart illustrating a method 300 for estimating phase error according to the first embodiment of the present invention. The steps of the method 300 are described as follows:

Step 301: Executing Hermitian transpose on the channel coefficient matrix H for generating a Hermitian-transposed channel coefficient matrix $H_A$;

Step 302: Multiplying the received signals y with the Hermitian-transposed channel coefficient matrix $H_A$ for generating the converted signals x';

Step 303: Summing all products of each of the converted signal x' and the corresponding pilot signal x; and Step 304: Generating the phase error $\theta$ according to the summation from the step 303.

Steps 303 and 304 have to be done in the pilot tone of the MIMO OFDM communications system 200 since the pilot signal x is only known in the pilot tone.

According to the first embodiment of the present invention, the MIMO OFDM system can comprises receiving antennas whose number is less than the number of the transmitting antenna. For example, assuming the number of the transmitting antennas $T_X$ is 2, and the number of the receiving antennas $R_X$ is 1 (a 2T1R OFDM communications system), therefore, the received signals can be derived from the following equations:

$$y_1 = [h_{11}\ h_{12}]\begin{bmatrix}x_1 e^{j\theta}\\ x_2 e^{j\theta}\end{bmatrix} = (h_{11}x_1 + h_{12}x_2)e^{j\theta} + \text{noise}. \quad (11)$$

According to the steps 301 and 302, the received signal $y_i$ multiplies with the Hermitian-transposed channel coefficient matrix $H_A$ and accordingly the converted signals $x_1'$ and $x_2'$ are generated, and according to the step 303, the products of $x_1'x_1*$ and $x_2'x_2*$ are summed, which is disclosed as the following equations:

$$x_1' x_1^* = h_{11}^* x_1^* y_1 = (|h_{11}|^2 |x_1|^2 + h_{11}^* h_{12} x_2 x_1^*)e^{j\theta}; \quad (12)$$

$$x_2' x_2^* = h_{12}^* x_2^* y_1 = (|h_{12}|^2 |x_2|^2 + h_{12}^* h_{11} x_1 x_2^*)e^{j\theta}; \text{ and} \quad (13)$$

-continued $$\begin{aligned}x_1' x_1^* + x_2' x_2^* &= (|h_{11}|^2|x_1|^2 + |h_{12}|^2|x_2|^2 + h_{11}^* h_{12}x_2 x_1^* + h_{12}^* h_{11}x_1 x_2^*)e^{j\theta}\\ &= (|h_{11}|^2|x_1|^2 + |h_{12}|^2|x_2|^2 + 2\text{Re}\{h_{11}^* h_{12}x_2 x_1^*\})e^{j\theta}\\ &= Ce^{j\theta}.\end{aligned} \quad (14)$$

Since in equation (14), "$x_1'x_1*+x_2'x_2*$" and C (equals to $(|h_{11}|^2|x_1|^2+|h_{12}|^2|x_2|^2+2\text{Re}\{h_{11}*h_{12}x_2x_1*\})$) are known, the phase error $\theta$ can be accurately calculated.

Figure 4:
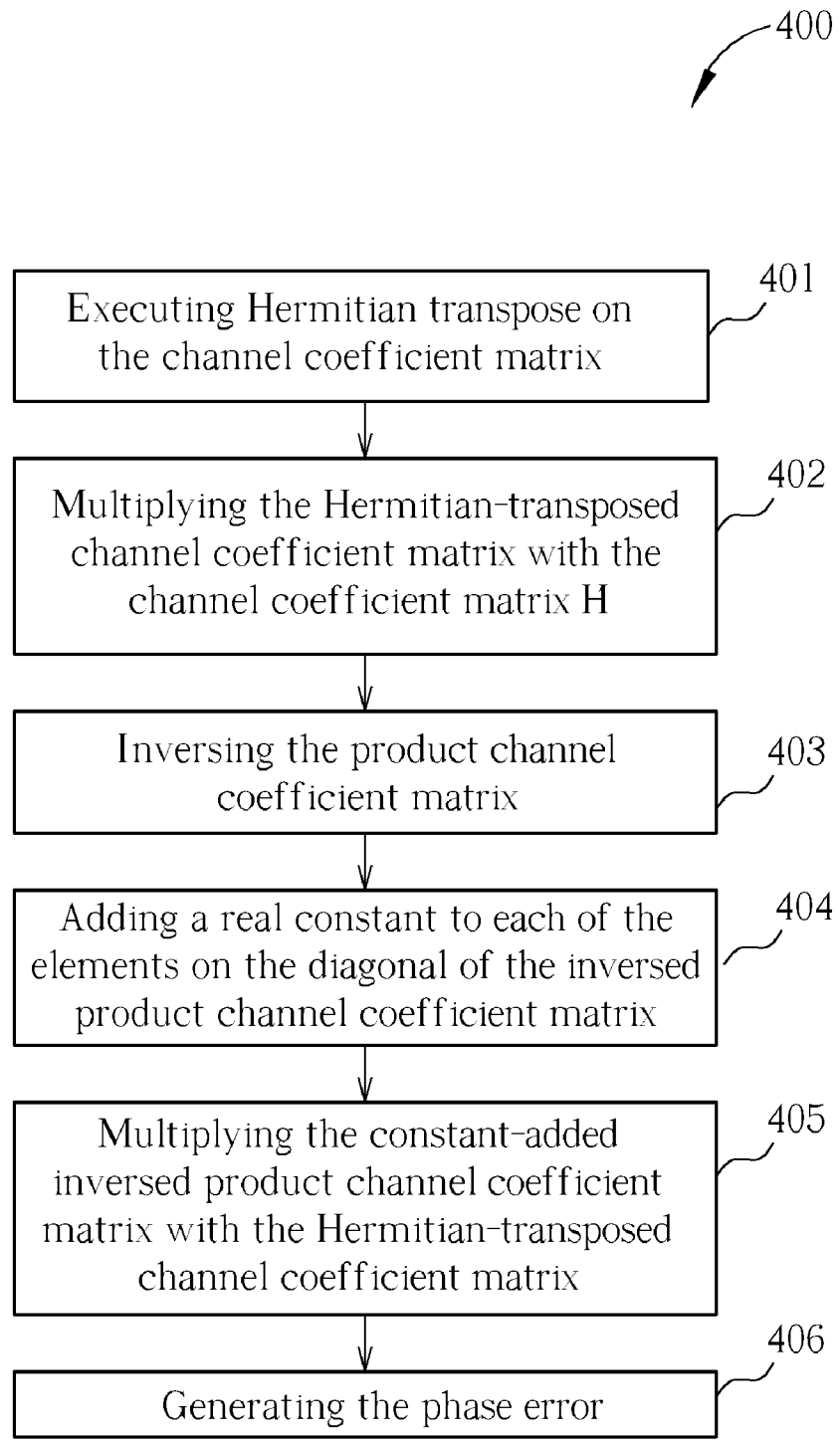
FIG. 4 is a flowchart illustrating a method for estimating phase error according to a second embodiment of the present invention.

Please refer to FIG. 4. FIG. 4 is a flowchart illustrating a method 400 for estimating phase error according to a second embodiment of the present invention. The steps are described as follows:

Step 401: Executing Hermitian transpose on the channel coefficient matrix H for generating a Hermitian-transposed channel coefficient matrix $H_A$;

Step 402: Multiplying the Hermitian-transposed channel coefficient matrix $H_A$ with the channel coefficient matrix H for generating a product channel coefficient matrix $H_B$;

Step 403: Inversing the product channel coefficient matrix $H_B$ for generating an inversed product channel coefficient matrix $H_C$;

Step 404: Adding a real constant Z to each of the elements on the diagonal of the inversed product channel coefficient matrix $H_C$ for generating constant-added inversed product channel coefficient matrix $H_D$;

Step 405: Multiplying the constant-added inversed product channel coefficient matrix $H_D$ with the Hermitian-transposed channel coefficient matrix $H_A$ for generating a diversity gain matrix $G_D$; and Step 406: Generating the phase error $\theta$ according to the diversity gain matrix $G_D$, the received signal matrix Y, and the pilot signal matrix X.

The method 400 for estimating the phase error $\theta$ is similar to the conventional method, and the difference is that in steps 404, a real constant Z is added to each of the elements on diagonal of the inversed product channel coefficient matrix $H_C$. In this way, the value of the gain of the diversity gain matrix $G_D$ can be increased. Furthermore, if the real constant Z is large enough, then the value of the gain of the diversity gain matrix $G_D$ is large enough as well so that in the equation (6), the noise matrix can be ignored. Therefore, the estimated phase error $\theta$ generated by the method 400 can be much more accurate than the phase error $\theta$ estimated by the conventional method.

The following description is an exemplary embodiment illustrating using the method 400 to estimate the phase error $\theta$. Assuming the number of the transmitting antennas $T_X$ is 2, and the number of the receiving antennas $R_X$ is 2 (a 2T2R OFDM communications system), therefore, the received signal y (after being fast Fourier transformed) can be derived from the following equations:

$$Y_{2\times 1} = \begin{pmatrix}y_1\\ y_2\end{pmatrix} = H_{2\times 2}\cdot X_{2\times 1} + N_{2\times 1} = \begin{pmatrix}h_{11} & h_{12}\\ h_{21} & h_{22}\end{pmatrix}\begin{pmatrix}x_1 e^{j\theta}\\ x_2 e^{j\theta}\end{pmatrix} + \begin{pmatrix}n_1\\ n_2\end{pmatrix}; \quad (8)$$

where $Y_{2\times 1}$ represents the received signal matrix after being fast Fourier transformed, $H_{2\times 2}$ represents the channel coefficient matrix, $X_{2\times 1}$ represents the pilot signal matrix, and $N_{2\times 1}$ represents the noise matrix. According to steps 401-405, the diversity gain matrix $G_D$ can be obtained by the following equation:

$$G_D = (H^H H)_Z^{-1} H^H = \qquad (15)$$

$$(H1 \cdot H)_Z^{-1} \cdot H1 = \left[ \begin{pmatrix} h_{11}^* & h_{21}^* \\ h_{12}^* & h_{22}^* \end{pmatrix} \begin{pmatrix} h_{11} & h_{21} \\ h_{21} & h_{22} \end{pmatrix} \right]_Z^{-1} \begin{pmatrix} h_{11}^* & h_{21}^* \\ h_{12}^* & h_{22}^* \end{pmatrix} =$$

$$\begin{pmatrix} |h_{11}|^2 + |h_{21}|^2 + Z & h_{11}^* h_{12} + h_{21}^* h_{22} \\ h_{12}^* h_{11} + h_{22}^* h_{21} & |h_{12}|^2 + |h_{22}|^2 + Z \end{pmatrix}^{-1} \begin{pmatrix} h_{11}^* & h_{21}^* \\ h_{12}^* & h_{22}^* \end{pmatrix} =$$

$$\frac{1}{K} \begin{pmatrix} P & S \\ R & Q \end{pmatrix};$$

where K equals $|h_{11}|^2|h_{22}|^2+|h_{12}|^2|h_{21}|^2+Z(|h_{11}|^2+|h_{12}|^2+|h_{21}|^2+|h_{22}|^2)+Z^2+h_{11}h_{22}h_{12}^*h_{21}^*+h_{11}^*h_{22}^*h_{12}h_{21}$, P equals $(|h_{22}|^2+Z)h_{11}^*-h_{12}^*h_{21}^*h_{22}$, Q equals $(|h_{11}|^2+Z)h_{22}^*-h_{21}^*h_{12}^*h_{11}$, R equals $(|h_{21}|^2+Z)h_{12}^*-h_{11}^*h_{22}^*h_{21}$, and S equals $(|h_{12}|^2+Z)h_{21}^*-h_{11}^*h_{22}^*h_{12}$. If the real constant Z is large enough, the diversity gain matrix $G_D$ can be further derived as the following equation:

$$G_D \approx \frac{1}{Z^2} \begin{pmatrix} Zh_{11}^* - h_{12}^* h_{21}^* h_{22} & Zh_{21}^* - h_{11}^* h_{22}^* h_{12} \\ Zh_{12}^* - h_{11}^* h_{22}^* h_{21} & Zh_{22}^* - h_{12}^* h_{21}^* h_{11} \end{pmatrix} \approx \frac{1}{Z} \begin{pmatrix} h_{11}^* & h_{21}^* \\ h_{12}^* & h_{22}^* \end{pmatrix}; \qquad (16)$$

where the gain of the diversity gain matrix $G_D$ according to the equation (16) is large enough to ignore the noise.

Additionally, the value of the real constant Z can be defined as the following equation for being large enough:

$$Z \leq 100 \cdot \text{Max}(\Sigma_{i=1}^{N_R}|h_{i1}|^2, \Sigma_{i=1}^{N_R}|h_{i2}|^2, \ldots, \Sigma_{i=1}^{N_R}|h_{iN_T}|^2) \qquad (17);$$

where $N_R$ represents the number of the receiving antennas, and $N_T$ represents the number of the transmitting antennas.

Furthermore, in the MIMO OFDM communications system 200 of the present invention, the space-time-frequency processing device 112 can choose different schemes, such as Space-Division Multiplexing (SDM), Space-Time Block Coding (STBC), or hybrid STBC-SDM modes, and the methods 300 and 400 are applicable to different space-time frequency processing schemes.

To sum up, the present invention provides method for efficiently estimating phase error in the MIMO OFDM system, and allows that the number of the receiving antennas can be less than the number of the transmitting antennas. In other words, there is no constraint on the numbers of the transmitting and receiving antennas, which provides great convenience. Furthermore, the method of the present invention can be applicable to different space-time-frequency processing schemes, which reduces cost.

Those skilled in the art will readily observe that numerous modifications and alterations of the device and method may be made while retaining the teachings of the invention.

What is claimed is:

1. A receiver of a Multiple Input Multiple Output (MIMO) Orthogonal Frequency Division Multiplexing (OFDM) communications system, the receiver comprising:
   at least one receiving antenna for receiving radio frequency signals from at least one receiving path;
      wherein a pilot signal is extracted from each of the received radio frequency signals;
   a receiving signal transforming module coupled to the at least one receiving antenna for receiving the radio frequency signals and generating transformed signals accordingly;
   a signal converting device coupled to the receiving signal transforming module for converting the transformed signals to converted signals;
   a signal summation device coupled to the signal converting device for summing products of the converted signals and complex conjugates of pilot signals corresponding to the converted signals and accordingly generating a sum result, and
   a Phase Lock Loop (PLL) coupled to the signal summation device, for estimating a phase error according to the sum result, the converted signals, and the complex conjugates of the pilot signals.

2. The receiver of claim 1, wherein the signal converting device executes Hermitian transpose on a channel coefficient matrix of the MIMO OFDM communications system and multiples a Hermitian-transposed channel coefficient matrix with the transformed radio frequency signals for generating the converted signals.

3. The receiver of claim 2, wherein each element in the channel coefficient matrix represents a channel coefficient between one transmitting antenna and one receiving antenna of the MIMO OFDM communications system.

4. The receiver of claim 1, wherein a number of receiving antennas is more than a number of transmitting antennas of a transmitter of the MIMO OFDM communications system.

5. The receiver of claim 1, wherein the receiving signal transforming module comprises:
   an RF circuit, coupled to the at least one receiving antenna for down-converting the radio frequency signals to analog signals;
   an Analog/Digital Converter (ADC) coupled to the RF circuit for converting the analog signals to digital signals; and
   a Fast Fourier Transform (FFT) device coupled between the ADC and the signal converting device for executing FFT on the digital signals and outputting the transformed signals to the signal converting device.

6. The receiver of claim 5, wherein the PLL further generates a clock signal with an adjusted phase according to the estimated phase error; and the receiver further comprises a timing/phase compensation device coupled to the FFT device and the PLL for compensating timing/phase of the transformed signals according to the adjusted phase and accordingly outputting compensated signals.

7. The receiver of claim 6, further comprising an equalizer coupled to the timing/phase compensation device for equalizing the compensated signals and accordingly outputting equalized signals.

8. The receiver of claim 7, further comprising a demodulation device coupled to the equalizer for demodulating the equalized signals and accordingly outputting data.

9. A method for estimating a phase error in a receiver of a MIMO OFDM communications system, the method comprising:
   executing Hermitian transpose on a channel coefficient matrix of the MIMO OFDM communications system for generating a Hermitian-transposed channel coefficient matrix;
   multiplying a received signal matrix of the receiver with the Hermitian-transposed channel coefficient matrix for generating converted signals;
   summing products of the converted signals and complex conjugates of pilot signals corresponding to the converted signals for generating a sum result, wherein the pilot signals are extracted from the received signal matrix; and generating the phase error according to the sum result, the converted signals, and the complex conjugates of the pilot signals.

10. The method of claim 9, further comprising:
converting radio frequency signals to digital signals; and
fast Fourier transforming the digital signals as the received signal matrix.

11. The method of claim 10, wherein converting the radio frequency signals to digital signals comprising:
down-converting the radio frequency signals to analog signals; and
converting the analog signals to the digital signals.

12. The method of claim 9, wherein each element in the channel coefficient matrix represents a channel coefficient between one transmitting antenna and one receiving antenna of the MIMO OFDM communications system.

13. A method for estimating a phase error in a receiver of a MIMO OFDM communications system, the method comprising:
executing Hermitian transpose on a channel coefficient matrix of the MIMO OFDM communications system for generating a Hermitian-transposed channel coefficient matrix;
multiplying the Hermitian-transposed channel coefficient matrix with the channel coefficient matrix for generating a product channel coefficient matrix;
inversing the product channel coefficient matrix for generating an inversed product channel coefficient matrix;
adding a real constant to each element on diagonal of the inversed product channel coefficient matrix for generating a constant-added inversed product channel coefficient matrix;
multiplying the constant-added inversed product channel coefficient matrix with the Hermitian-transposed channel coefficient matrix for generating a diversity gain matrix; and
generating the phase error according to the diversity gain matrix, a received signal matrix, and a pilot signal matrix.

14. The method of claim 13, further comprising:
converting radio frequency signals to digital signals; and
fast Fourier transforming the digital signals as the received signal matrix.

15. The method of claim 14, wherein converting the radio frequency signals to digital signals comprising:
down-converting the radio frequency signals to analog signals; and
converting the analog signals to the digital signals.

16. The method of claim 13, wherein each element in the channel coefficient matrix represents a channel coefficient between one transmitting antenna and one receiving antenna of the MIMO OFDM communications system.

17. The method of claim 13, wherein each element in the received signal matrix represents a received signal of one receiving antenna of the MIMO OFDM communications system, and each element in the pilot signal matrix represent a pilot signal contained in a received signal.

18. The method of claim 13, wherein value of the real constant is defined as the following equation:

$$Z \leq 100 \cdot \text{Max}(\Sigma_{i=1}^{N_R}|h_{i1}|^2, \Sigma_{i=1}^{N_R}|h_{i2}|^2, \ldots, \Sigma_{i=1}^{N_R}|h_{iN_T}|^2);$$

wherein Z represents the real constant, $N_R$ represents a number of receiving antennas, $N_T$ represents a number of transmitting antennas, and $h_{ij}$ represents a channel coefficient between one transmitting antenna and one receiving antenna of the MIMO OFDM communications system.

* * * * *